US012606012B2

(12) United States Patent (10) Patent No.: US 12,606,012 B2
Takenoya (45) Date of Patent: Apr. 21, 2026

(54) BATTERY-EQUIPPED VEHICLE INCLUDING MOVABLE UNDER PANEL

(71) Applicant: SUBARU CORPORATION, Tokyo (JP)

(72) Inventor: Yuta Takenoya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 287 days.

(21) Appl. No.: 18/535,833

(22) Filed: Dec. 11, 2023

(65) Prior Publication Data

US 2024/0253454 A1 Aug. 1, 2024

(30) Foreign Application Priority Data

Jan. 31, 2023 (JP) .................................. 2023-013055

(51) Int. Cl.
| | |
|---|---|
| *B60K 11/08* | (2006.01) |
| *B60K 1/04* | (2019.01) |
| *B60K 11/06* | (2006.01) |
| *B60K 1/00* | (2006.01) |
| *H01M 50/249* | (2021.01) |

(52) U.S. Cl.
CPC .............. *B60K 11/085* (2013.01); *B60K 1/04* (2013.01); *B60K 11/06* (2013.01); *B60K 2001/005* (2013.01); *B60K 2001/0438* (2013.01); *H01M 50/249* (2021.01)

(58) Field of Classification Search
CPC ........ B60K 1/04; B60K 11/06; B60K 11/085; B60K 2001/005; B60K 2001/0438; H01M 50/249
See application file for complete search history.

(56) References Cited

U.S. PATENT DOCUMENTS

| | | | |
|---|---|---|---|
| 2020/0168965 A1 | 5/2020 | Tanaka et al. | |
| 2021/0221253 A1* | 7/2021 | Watanabe | ............... B60L 50/66 |
| 2022/0097510 A1* | 3/2022 | Yamamoto | .......... H01M 8/0494 |

FOREIGN PATENT DOCUMENTS

| | | |
|---|---|---|
| JP | 2013-035323 A | 2/2013 |
| JP | 2020-082983 A | 6/2020 |

* cited by examiner

*Primary Examiner* — Edwin A Young
(74) *Attorney, Agent, or Firm* — McGinn IP Law Group, PLLC

(57) ABSTRACT

A battery-equipped vehicle includes an under panel, a battery, a panel lifting and lowering mechanism, and a control device. The under panel is provided near a bottom surface of the vehicle. The battery is disposed under a floor of the vehicle and above the under panel. The panel lifting and lowering mechanism is configured to lift or lower the under panel in a vertical direction. The control device is configured to control at least an operation of the panel lifting and lowering mechanism.

13 Claims, 8 Drawing Sheets

<HIGH-SPEED TRAVELING>

- GRILLE SHUTTER: Close
- UNDER PANEL: Down

<BATTERY COOLING>

- GRILLE SHUTTER: Open
- UNDER PANEL: Lift Slightly

<TRAVELING ON BAD ROAD>

■ GRILLE SHUTTER: Open or Close
■ UNDER PANEL: Half Down

<LOW OUTSIDE AIR TEMPERATURE>

■ GRILLE SHUTTER: Close
■ UNDER PANEL: Lift

BATTERY-EQUIPPED VEHICLE INCLUDING MOVABLE UNDER PANEL

CROSS-REFERENCE TO RELATED APPLICATIONS

The present application claims priority from Japanese Patent Application No. 2023-013055 filed on Jan. 31, 2023, the entire contents of which are hereby incorporated by reference.

BACKGROUND

The disclosure relates to a battery-equipped vehicle including an under panel that ascends or descends in a vertical direction relative to the vehicle.

Hitherto, vehicles include batteries that can store electric power for driving electric motors or the like. In recent years, the battery capacity has increased for electrification of vehicles as typified by electric vehicles. The battery may be mounted under the floor of the vehicle.

The battery in use generates heat, and is to be cooled by any appropriate method. Japanese Unexamined Patent Application Publication (JP-A) Nos. 2020-082983 and 2013-035323 propose that the battery mounted under the floor of the vehicle is cooled by taking traveling air between the battery and an undercover (referred to also as "under panel") of the vehicle.

SUMMARY

An aspect of the disclosure provides a battery-equipped vehicle including an under panel, a battery, a panel lifting and lowering mechanism, and a control device. The under panel is provided near a bottom surface of the vehicle. The battery is disposed under a floor of the vehicle and above the under panel. The panel lifting and lowering mechanism is configured to lift or lower the under panel in a vertical direction. The control device is configured to control at least an operation of the panel lifting and lowering mechanism.

An aspect of the disclosure provides a battery-equipped vehicle including an under panel, a battery, a panel lifting and lowering mechanism, and circuitry. The under panel is provided near a bottom surface of the vehicle. The battery is disposed under a floor of the vehicle and above the under panel. The panel lifting and lowering mechanism includes an actuator and is configured to lift or lower the under panel in a vertical direction. The circuitry is configured to control at least an operation of the panel lifting and lowering mechanism.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

According to JP-A Nos. 2020-082983 and 2013-035323, the battery disposed under the floor of the vehicle can be cooled by efficiently taking traveling air toward the battery while saving space. The large-capacity battery mounted under the floor of the vehicle may cause an increase in the weight of the vehicle. It is desirable to improve the aerodynamic characteristics of the vehicle while cooling the battery.

It is desirable to provide a battery-equipped vehicle including an undercover and a battery mounted under the floor of the vehicle with its aerodynamic characteristics improved while cooling the battery.

Vehicles according to exemplary embodiments of the present disclosure are described. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Illustration may be omitted as appropriate for elements and structures that are not directly related to the embodiments of the present disclosure. The structure of the vehicle other than the structure detailed below and a battery and other on-board components may be complemented as appropriate by, for example, the structures described in JP-A Nos. 2020-082983 and 2013-035323 or other known structures.

First Embodiment

Battery-Equipped Vehicle 100

Figure 1:
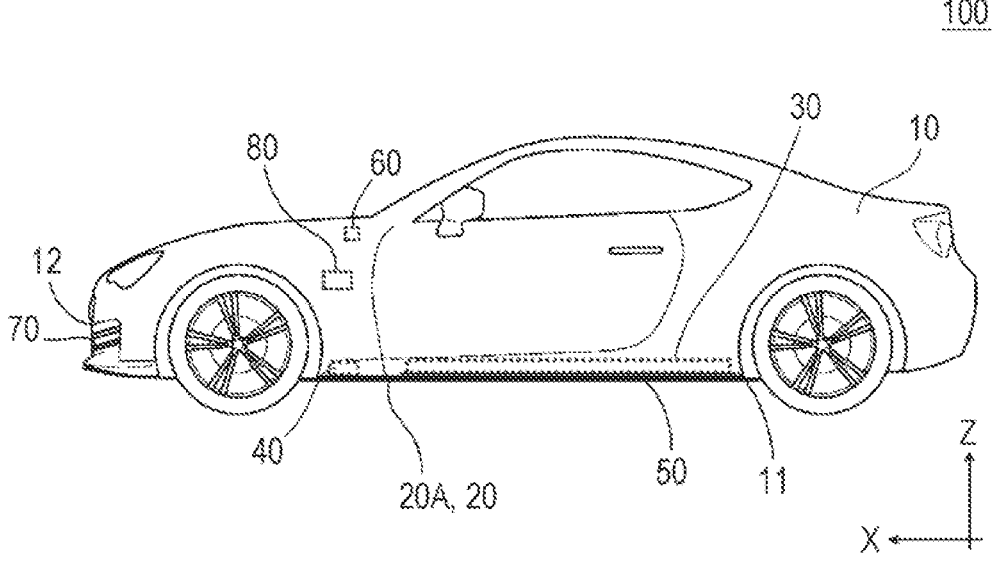
FIG. 1 is a schematic diagram illustrating an example of the structure of a battery-equipped vehicle according to an embodiment.

FIG. 1 illustrates a main part of a battery-equipped vehicle 100 according to a first embodiment of the present disclosure.

In FIG. 1 and the like, the battery-equipped vehicle 100 of this embodiment is a vehicle 10 including an under panel 20, a battery 30, a panel lifting and lowering mechanism 40, a heat retainer 50, an outside air temperature sensor 60, a grille shutter 70, and a control device 80.

Examples of the vehicle 10 include an electric vehicle to be driven by an electric motor. The vehicle 10 is not particularly limited as long as the vehicle includes the battery 30 described later. Examples of the vehicle 10 include, in addition to the electric vehicle, a hybrid vehicle including a gasoline engine as well and vehicles including other internal combustion engines. The drive system of the vehicle 10 may be front-wheel drive, rear-wheel drive, or all-wheel drive.

Figure 2:
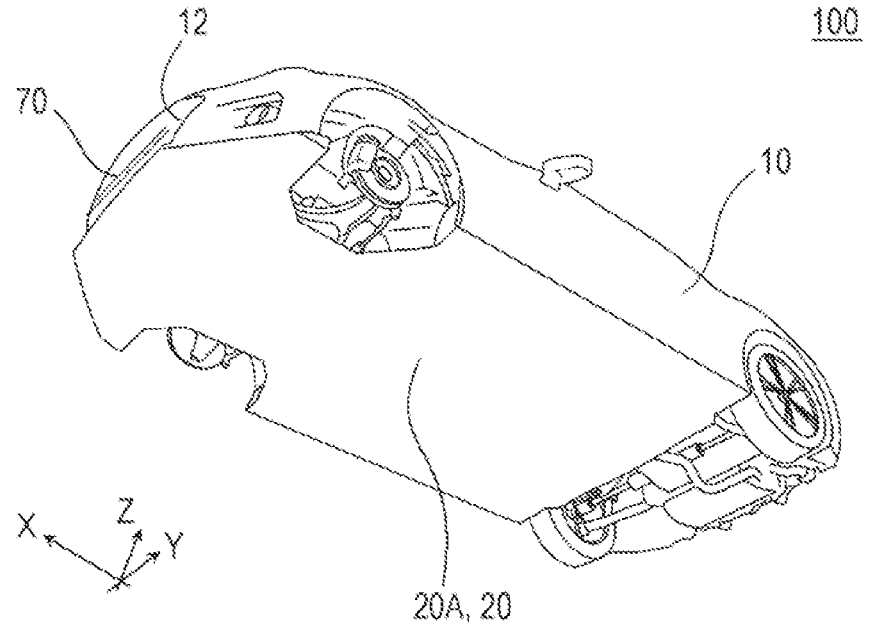
FIG. 2 is an elevational view of the battery-equipped vehicle according to the embodiment that is viewed from the bottom.

An under panel 20A that is an example of the under panel 20 of the embodiments of the present disclosure is also referred to as "undercover", and is provided at the bottom of the vehicle 10 as illustrated in FIGS. 1 and 2. With the battery-equipped vehicle 100 of this embodiment including the under panel 20A, air flowing under the bottom of the vehicle is regulated to improve the aerodynamic characteristics of the vehicle. The structure of the under panel 20A is not particularly limited as long as the under panel 20A can be lifted or lowered by the panel lifting and lowering mechanism 40 described later, and various known materials and shapes are applicable.

The battery 30 supplies drive electric power to a load such as a known electric motor (not illustrated) mounted on the vehicle 10, and stores regenerated electric power. Examples of the battery 30 include a known lithium ion secondary battery. The battery 30 is not limited to the lithium ion secondary battery, and may be various known secondary batteries such as a nickel-metal hydride battery and a lead acid battery.

The battery 30 of this embodiment is disposed in a space 11 under the floor of the vehicle 10 and above the under panel 20A. As illustrated in FIG. 1, the battery 30 of this embodiment may be, for example, fixed to the lower side of a floor panel of the vehicle with a known fixing bracket (not illustrated) as in JP-A No. 2020-082983. The battery 30 fixed to the lower side of the floor panel faces the upper surface of the under panel 20A.

The panel lifting and lowering mechanism 40 lifts or lowers the under panel 20A in a vertical direction so that traveling air received by the traveling battery-equipped vehicle 100 is allowed to flow toward the battery 30 or is blocked from the battery 30. Examples of the panel lifting and lowering mechanism 40 include a known air or hydraulic cylinder mechanism and a motor drive mechanism using a stepper motor or the like. For example, the panel lifting and lowering mechanism 40 can be provided at multiple positions on the under panel 20A and lift or lower the under panel 20A in the vertical direction under control of the control device 80 described later. That is, the panel lifting and lowering mechanism 40 may include an actuator like the known air or hydraulic cylinder mechanism and a motor drive mechanism.

The heat retainer 50 retains heat of the battery 30. For example, the heat retainer 50 of this embodiment is provided on the upper surface of the under panel that faces the battery 30. Examples of the heat retainer 50 include various known heat insulators such as glass wool and heat insulating resin. The heat retainer 50 may be a known heat generating mechanism such as an electrically heated wire that generates heat by receiving electric power supplied from the battery 30. The heat retainer 50 may be omitted from the battery-equipped vehicle 100 as appropriate.

Examples of the outside air temperature sensor 60 include a known on-board sensor that is mounted on the battery-equipped vehicle 100 and can detect an outside air temperature around the vehicle. As described later, the control device 80 may drive (lift) the under panel 20A via the panel lifting and lowering mechanism 40 based on the outside air temperature around the vehicle detected by the outside air temperature sensor 60 so that the under panel 20A adjoins (comes closer to or into contact with) the battery 30. When the heat retainer 50 is provided on the upper surface of the under panel 20A, the panel lifting and lowering mechanism 40 lifts the under panel 20A so that the under panel 20A and the battery 30 adjoin each other with the heat retainer 50 interposed therebetween.

The grille shutter 70 is provided at a front grille 12 of the vehicle 10 and includes a mechanism that allows or blocks the flow of traveling air. When the traveling air flows into the traveling battery-equipped vehicle 100 through the front grille 12, at least a part of the traveling air is allowed to flow toward the battery 30 or is blocked.

For example, a known grille shutter mechanism disclosed in JP-A No. 2021-167161 or 2022-174585 may be applied as the grille shutter 70. The grille shutter 70 may be omitted from the battery-equipped vehicle 100 as appropriate.

Figure 3A:
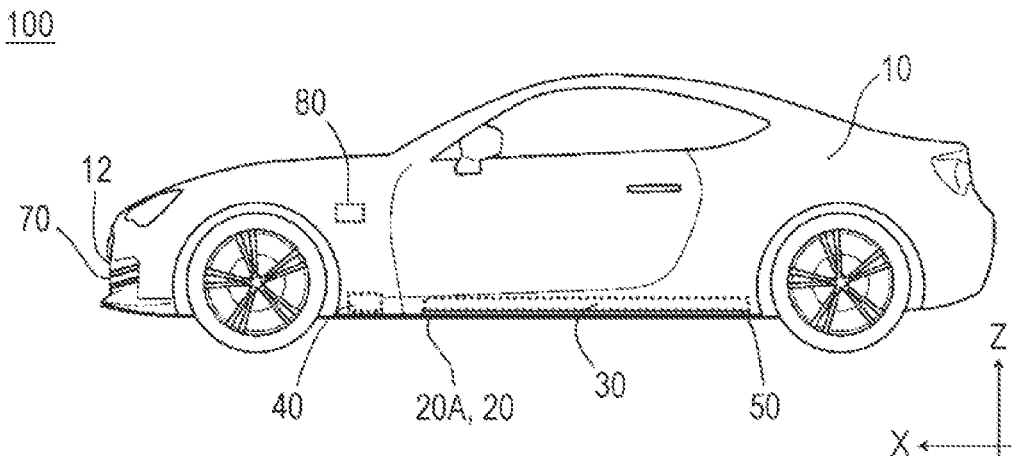
FIGS. 3A and 3B are schematic diagrams illustrating state transition of a movable under panel of the battery-equipped vehicle according to the embodiment.
Figure 3B:
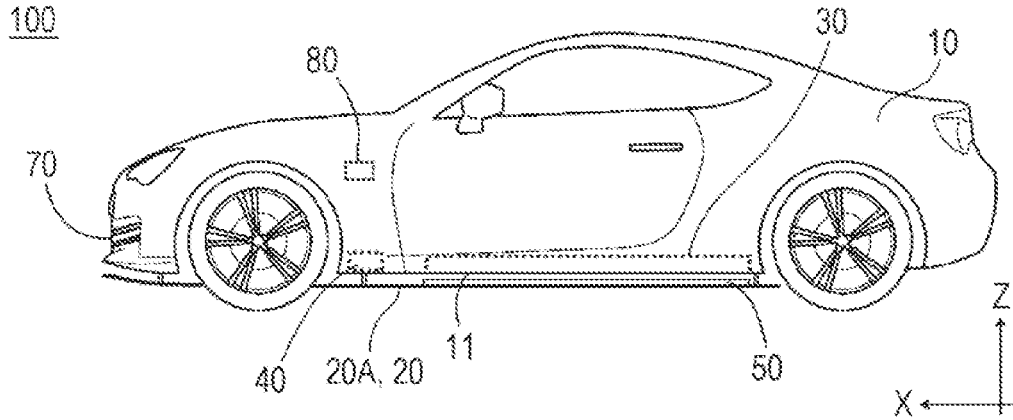

The control device 80 controls, for example, the operations of the panel lifting and lowering mechanism 40 and the grille shutter 70. FIGS. 3A and 3B illustrate an example of state transition of the under panel 20A of the battery-equipped vehicle 100.

As illustrated in FIG. 3A, the control device 80 can lift the under panel 20A via the panel lifting and lowering mechanism 40. For example, the under panel 20A can reach its upper limit position and adjoin the battery 30. When the heat retainer 50 is provided on the upper surface of the under panel 20A, the under panel 20A and the battery 30 can come closer to each other with the heat retainer 50 interposed therebetween.

As illustrated in FIG. 3B, the control device 80 can lower (down) the under panel 20A via the panel lifting and lowering mechanism 40. For example, the under panel 20A can reach its lower limit position and stay away from the battery 30 by a predetermined distance. Traveling air flowing into the vehicle through the grille shutter 70 can pass along a flow path between the battery 30 disposed in the space 11 under the floor and the under panel 20 as cooling air for cooling the battery 30.

The upper limit position and the lower limit position of the under panel 20A can be set as appropriate depending on, for example, the height or tire size of the battery-equipped vehicle 100. The control device 80 can set the under panel 20A not only to the upper limit position or the lower limit position but also to any position between the upper limit position and the lower limit position (for example, a position corresponding to "Lift Slightly" or "Half Down" described later).

The control device 80 may be an on-board electronic control unit (ECU) and include one or more processors such as a central processing unit (CPU) and one or more memories such as a random access memory (RAM) or a read only memory (ROM) communicatively coupled to the processors. When the one or more processors execute computer programs, the control device 80 can control, for example, the operation of lifting or lowering the under panel 20A by the panel lifting and lowering mechanism 40 and the operation of opening or closing the grille shutter 70.

The computer programs cause the processors to perform operations to be performed by the control device 80. The computer programs to be executed by the processors may be recorded in a recording medium that may serve as a storage (memory: not illustrated) in the control device 80, recorded in a recording medium built in the control device 80 or a known recording medium external to the control device 80, or downloaded from the outside of the battery-equipped vehicle 100 via a known network.

The recording medium that records the computer programs may be a magnetic medium such as a hard disk drive, a floppy disk, or a magnetic tape, an optical recording medium such as a compact disc read only memory (CD-ROM), a digital versatile disc (DVD), or a Blu-ray (registered trademark) disc, a magneto-optical medium such as a floptical disk, a storage element such as a RAM or a ROM, a flash memory such as a universal serial bus (USB) memory, a solid state drive (SSD), or any other medium that can store programs.

Cooperation Between Under Panel and Grille Shutter by Control Device of Disclosed Embodiment Examples of control on the panel lifting and lowering mechanism 40 and the grille shutter 70 by the control device 80 in the first embodiment are described with reference to FIGS. 4 to 7 as well. The control device 80 controls the operations of the under panel 20A and the shutter provided at the front grille 12, thereby improving the aerodynamic characteristics of the traveling vehicle while cooling the battery 30.

Figure 4:
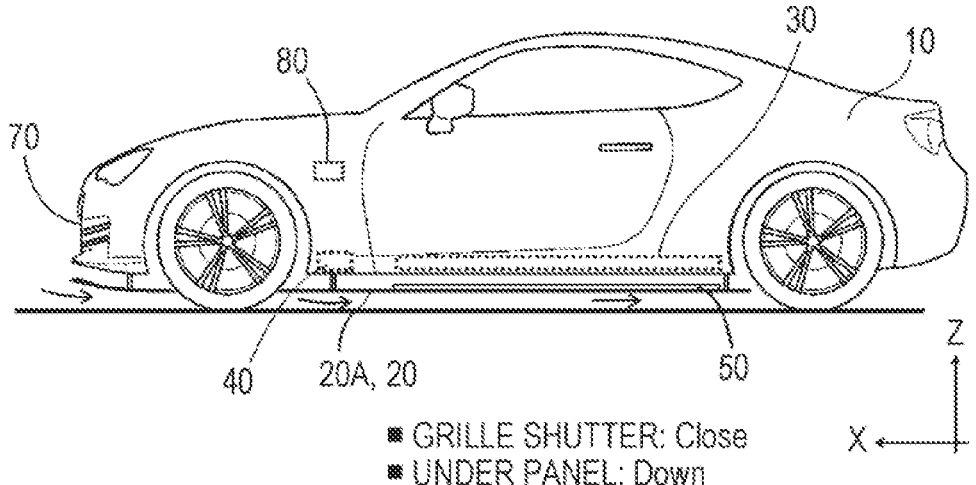
FIG. 4 is a schematic diagram illustrating the states of the under panel and a grille shutter, for example, during high-speed traveling.

FIG. 4 illustrates the states of the under panel and the grille shutter during high-speed traveling as an example of the control on the panel lifting and lowering mechanism 40 and the grille shutter 70 by the control device 80. When the battery-equipped vehicle 100 is traveling, for example, on an expressway or at a high speed equal to or higher than a predetermined speed (relatively high speed such as 80 km/h designated by law), the control device 80 controls the panel lifting and lowering mechanism 40 to lower the under panel 20A to the lower limit position and a known shutter opening and closing driver (not illustrated) to close the grille shutter 70.

That is, when the battery-equipped vehicle 100 is traveling at a high speed, the grille shutter 70 is closed to close the flow path for cooling the battery 30, and the under panel 20A is brought closer to the ground to increase the flow rate of traveling air that flows under the vehicle. By increasing the flow rate of the traveling air that flows under the vehicle, the downforce on the vehicle increases and the stability of the traveling vehicle can be improved.

Figure 5:
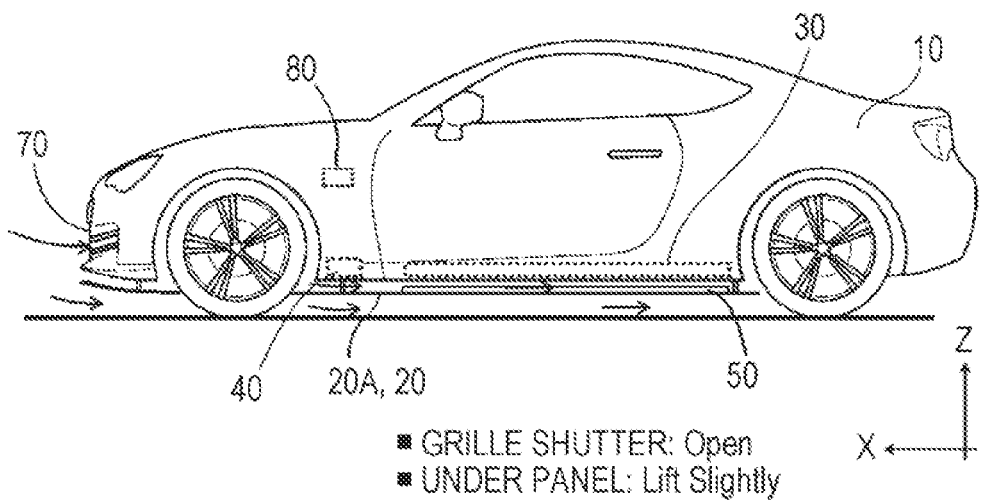
FIG. 5 is a schematic diagram illustrating the states of the under panel and the grille shutter, for example, during battery cooling.

FIG. 5 illustrates the states of the under panel and the grille shutter during battery cooling as another example of the control on the panel lifting and lowering mechanism 40 and the grille shutter 70 by the control device 80. When the temperature of the battery 30 has reached a predetermined temperature at which cooling is to be performed, the control device 80 controls the panel lifting and lowering mechanism 40 to lift the under panel 20A from the lower limit position by a predetermined distance (not up to the upper limit position) and the known shutter opening and closing driver (not illustrated) to open the grille shutter 70. The degree of lift of the under panel from the lower limit position can be preset by experiment or simulation in consideration of the specifications of the battery and the like, depending on how much the flow path between the battery and the under panel is narrowed.

For example, in a high-temperature state in which the battery 30 is to be cooled, a part of the traveling air from the front grille 12 is taken into the vehicle through the grille shutter 70 to flow along the narrowed flow path toward the battery 30. Further, the vehicle stability can be improved by increasing the flow rate of the traveling air that flows under the vehicle.

The "predetermined temperature of the battery 30 at which cooling is to be performed" may take various values depending on the specifications of battery cells and the like, and may therefore be preset by experiment or simulation.

Figure 6:
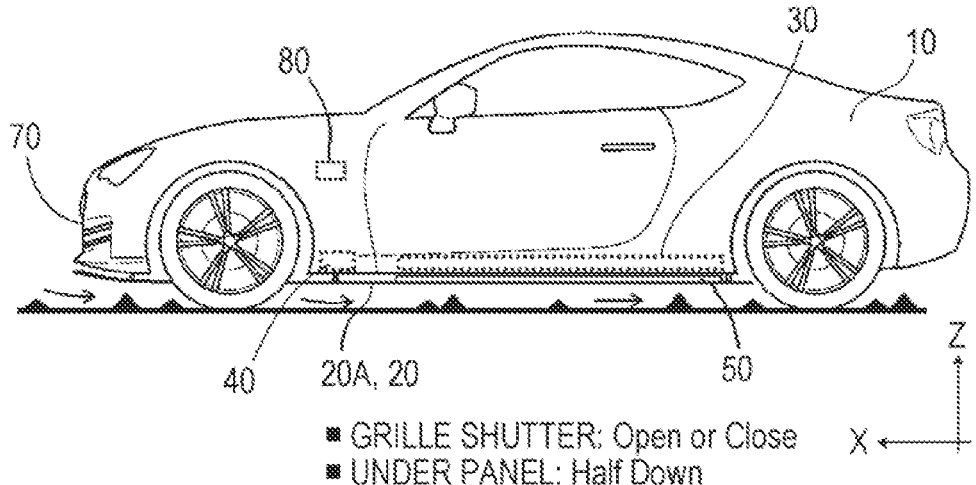
FIG. 6 is a schematic diagram illustrating the states of the under panel and the grille shutter, for example, during traveling on a bad road.

FIG. 6 illustrates the states of the under panel and the grille shutter during traveling on a bad road as another example of the control on the panel lifting and lowering mechanism 40 and the grille shutter 70 by the control device 80. When the battery-equipped vehicle 100 travels on a bad road with unevenness or gravel, such as an unpaved road, the control device 80 controls the panel lifting and lowering mechanism 40 to set the under panel 20A to a middle position (for example, to the middle of the upper limit position and the lower limit position) and the known shutter opening and closing driver (not illustrated) to close the grille shutter 70.

When an obstacle such as unevenness or gravel on the bad road where the vehicle is traveling is about to come into contact with the battery 30, the under panel 20A serves as a cushion to reduce the possibility of damage to the battery 30. During the traveling on the bad road, the control device 80 may control the known shutter opening and closing driver (not illustrated) to open the grille shutter 70.

Figure 7:
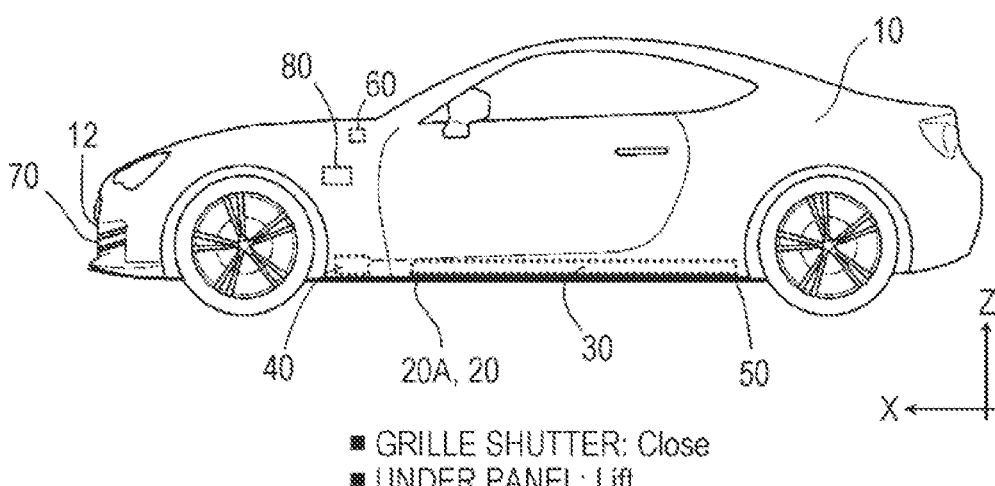
FIG. 7 is a schematic diagram illustrating the states of the under panel and the grille shutter, for example, at a low outside air temperature.

FIG. 7 illustrates the states of the under panel and the grille shutter at a low outside air temperature as another example of the control on the panel lifting and lowering mechanism 40 and the grille shutter 70 by the control device 80. In this example, the battery-equipped vehicle 100 includes the outside air temperature sensor 60. When the outside air temperature detected by the outside air temperature sensor 60 is low, the control device 80 controls the panel lifting and lowering mechanism 40 to lift the under panel 20A to the upper limit position and the known shutter opening and closing driver (not illustrated) to close the grille shutter 70.

When the outside air temperature around the battery-equipped vehicle 100 is low, the inflow of the traveling air through the grille shutter is blocked and the under panel 20A adjoins the battery 30. Thus, the heat retention effect of the battery 30 can be improved. When the heat retainer 50 is provided on the upper surface of the under panel 20A, the battery 30 comes into contact with the heat retainer 50. Thus, the heat retention effect can further be improved.

Whether the outside air temperature around the vehicle is low may vary depending on the specifications of the battery 30. Therefore, the "low temperature" state may be preset by experiment or simulation.

As shown in Table 1, the control device 80 can control one or more of the cooling and the heat retention of the battery 30 by causing the grille shutter 70 and the under panel 20A to cooperate depending on the traveling condition of the vehicle. The conditions shown in Table 1 are examples. Any other condition such as "high outside air temperature" may be added as appropriate to achieve optimum cooperation between the grille shutter 70 and the under panel 20A.

In this embodiment, the operation states of the grille shutter 70 and the under panel 20A associated with the traveling condition of the vehicle may be stored in the recording medium or an external server. The control device 80 may perform control by accessing the recording medium or the external server and referring to the operation states of the grille shutter 70 and the under panel 20A associated with the traveling condition. Although the grille shutter 70 is controlled to open or close as well, the control device 80 may at least control the panel lifting and lowering mechanism 40 to operate the under panel 20A depending on the traveling condition of the vehicle.

TABLE 1

| Condition | Grille shutter | Under panel |
| --- | --- | --- |
| High-speed traveling | Close | Down |
| Battery cooling | Open | Lift slightly |
| Traveling on bad road | Open or close | Half down |
| Low outside air temperature | Close | Lift |

With the battery-equipped vehicle 100 including at least the movable under panel 20A according to the first embodiment, the aerodynamic characteristics of the vehicle can be improved by the under panel 20A that can ascend or descend in the vertical direction of the vehicle while cooling the battery 30 mounted in the space 11 under the floor of the vehicle 10.

Second Embodiment

Figure 8:
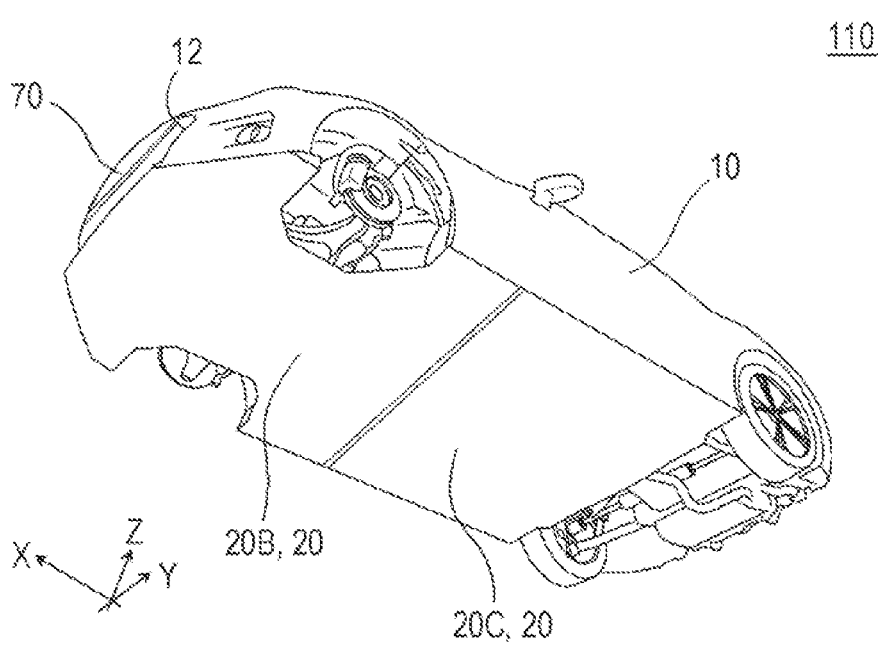
FIG. 8 is an elevational view of a battery-equipped vehicle according to an embodiment that is viewed from the bottom.
Figure 9A:
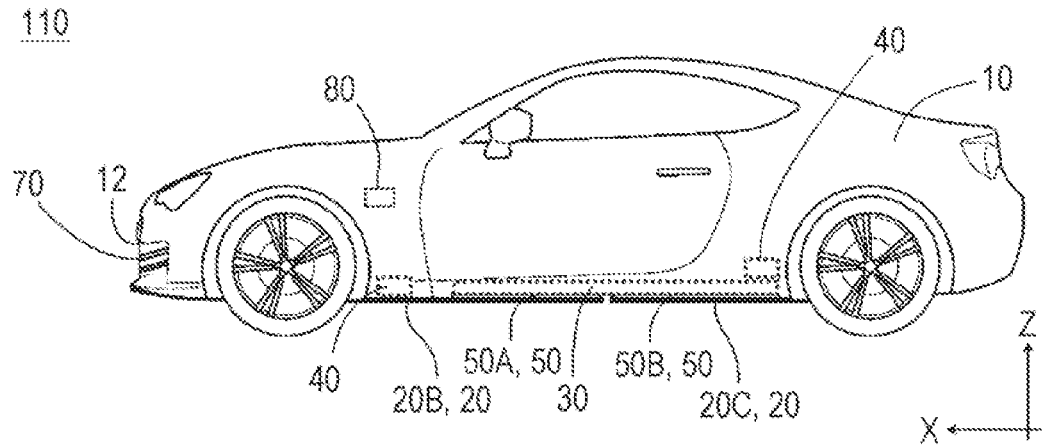
FIGS. 9A and 9B are schematic diagrams illustrating possible examples of the state of a movable under panel of the battery-equipped vehicle according to the embodiment.
Figure 9B:
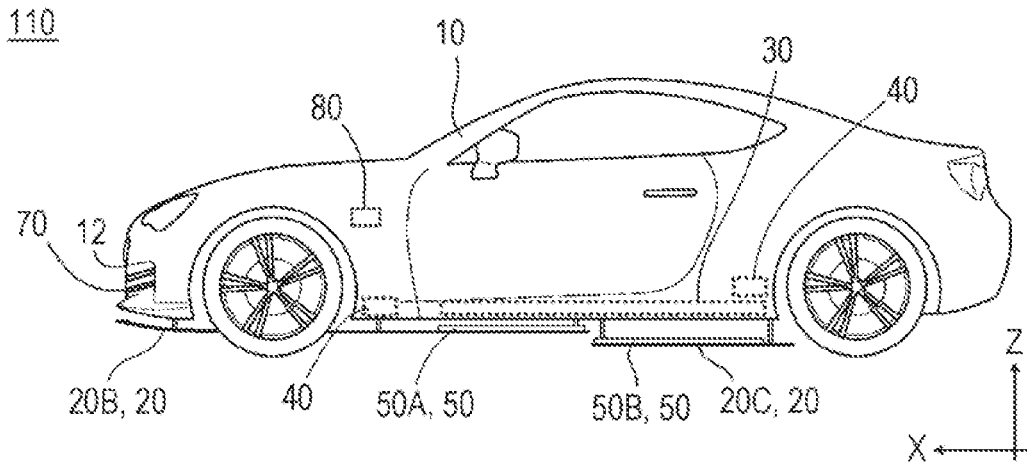

FIGS. 8, 9A, and 9B illustrate a main part of a battery-equipped vehicle 110 according to a second embodiment of the present disclosure. In the following embodiment and modifications, differences from the first embodiment are mainly described, and components serving similarly to those in the first embodiment are represented by the same reference symbols to omit their description as appropriate.

In the illustrated battery-equipped vehicle 110 of this embodiment, the under panel 20 of the embodiments of the present disclosure is divided into two parts at the front and rear of the vehicle 10. The divided parts can be lifted or lowered independently by panel lifting and lowering mechanisms 40. As illustrated in FIGS. 9A and 9B, the under panel 20 of this embodiment includes an under panel 20B that covers a front side of the bottom of the vehicle 10, and an under panel 20C that covers a rear side of the bottom of the vehicle 10.

As illustrated in FIG. 9A, the control device 80 can control the panel lifting and lowering mechanisms 40 to, for example, set the front under panel 20B to the upper limit position and the rear under panel 20C to the upper limit position.

As illustrated in FIG. 9B, the control device 80 can control the panel lifting and lowering mechanisms 40 to, for example, set the front under panel 20B to the upper limit position and the rear under panel 20C to the lower limit position.

In this embodiment, the under panel 20 is divided into two parts in a length direction of the vehicle (X direction), but may be divided into two parts in a width direction of the vehicle (Y direction). In this embodiment, the under panel 20 is divided into two parts, but may be divided into three or more parts as appropriate.

That is, the under panel 20 may be divided into multiple parts in the width or length direction of the vehicle 10, and the panel lifting and lowering mechanism 40 may lift or lower the divided parts of the under panel independently of each other.

Although the exemplary embodiments of the present disclosure have been described above in detail with reference to the accompanying drawings, the embodiment of the present disclosure is not limited to such embodiments.

First Modification

Figure 10A:
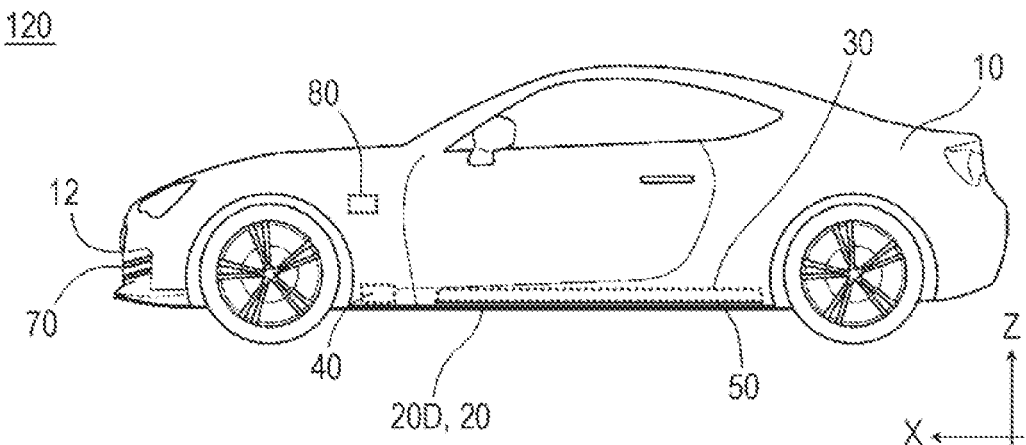
FIGS. 10A and 10B are schematic diagrams illustrating an example of the structure of a battery-equipped vehicle according to a modification.
Figure 10B:
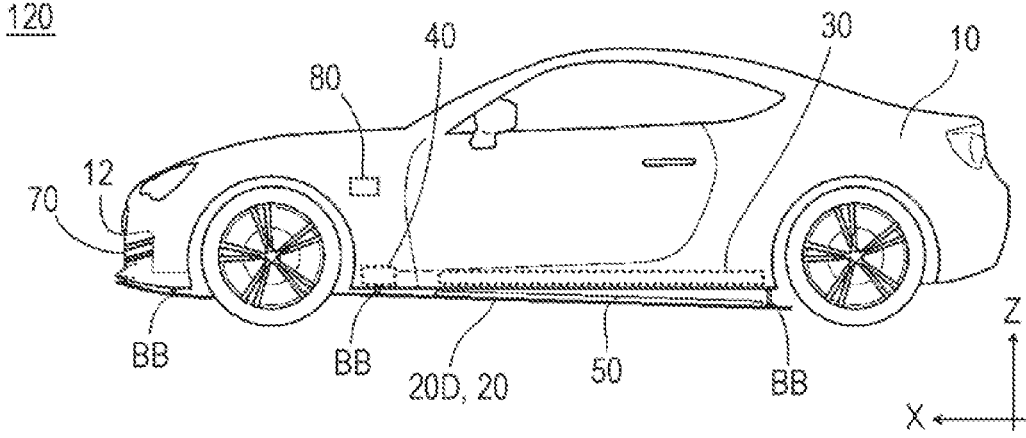

FIGS. 10A and 10B illustrate a battery-equipped vehicle 120 according to a first modification.

In the embodiments described above, the control device 80 lifts or lowers the under panels 20A to 20C parallel to a horizontal direction via the panel lifting and lowering mechanism 40. However, the embodiment of the present disclosure is not limited to such embodiments. The control device 80 may lift or lower the under panel 20 in a posture in which the under panel 20 is not parallel to the horizontal direction (XY plane in the figures).

As illustrated in the figures, an under panel 20D according to the first modification is coupled to panel lifting and lowering mechanisms 40 via known bearings that allow inclination. For example, the control device 80 can vary the amount of lift or lowering of the under panel 20D via the panel lifting and lowering mechanism 40 on the front side of the vehicle and the amount of lift or lowering of the under panel 20D via the panel lifting and lowering mechanism 40 on the rear side of the vehicle.

For example, as illustrated in FIG. 10B, the control device 80 can incline the under panel 20D to cross the horizontal direction via the panel lifting and lowering mechanisms 40 so that the part of the under panel 20D on the rear side of the vehicle is positioned below the part of the under panel 20D on the front side of the vehicle in the vertical direction.

Second Modification

Figure 11:
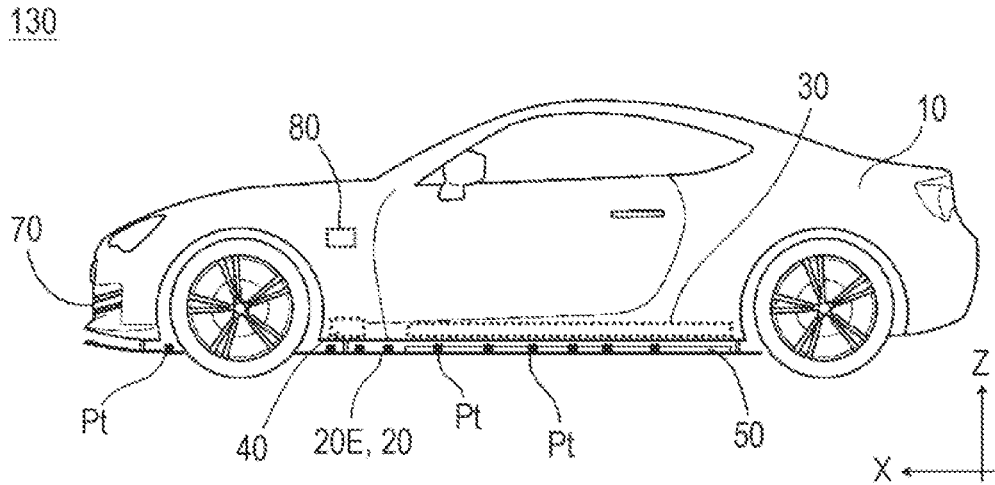
FIG. 11 is a schematic diagram illustrating an example of the structure of a battery-equipped vehicle according to a modification.

FIG. 11 illustrates a battery-equipped vehicle 130 according to a second modification.

As illustrated in the figure, an under panel 20E according to the second modification has one or more protrusions Pt on the upper surface that faces the battery 30 so that traveling air is blown on the protrusions Pt. When the heat retainer 50 is provided on the upper surface, the one or more protrusions Pt may be provided on the upper surface of the under panel 20E at positions different from that of the heat retainer 50.

Although the one or more protrusions Pt according to the second modification are provided on the upper surface of the under panel 20E, the embodiment of the present disclosure is not limited to such an embodiment. The one or more protrusions Pt may be provided on the bottom surface of the battery 30 that faces the under panel 20. In other words, the battery-equipped vehicle 130 may have the one or more protrusions Pt on one or more of the bottom surface of the battery 30 that faces the under panel 20 and the upper surface of the under panel 20E that faces the battery 30 so that the traveling air is blown on the protrusions Pt.

Persons having ordinary skill in the art including the embodiments of the present disclosure may conceive modifications to the embodiments within the scope of the technical spirit described in the claims. It is understood that the technical scope of the embodiments of the present disclosure includes various modifications including the examples described above.

According to the embodiments of the present disclosure, the aerodynamic characteristics of the traveling vehicle can be improved while cooling the battery mounted under the floor of the vehicle.

The control device 80 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 80. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A battery-equipped vehicle comprising:
an under panel provided near a bottom surface of the vehicle;
a battery disposed under a floor of the vehicle and above the under panel;
a panel lifting and lowering mechanism configured to lift or lower the under panel in a vertical direction; and
a control device configured to control at least an operation of the panel lifting and lowering mechanism.

2. The battery-equipped vehicle according to claim 1, further comprising:
a heat retainer provided on an upper surface of the under panel that faces the battery; and
an outside air temperature sensor configured to detect an outside air temperature around the vehicle,
wherein the control device is configured to lift the under panel via the panel lifting and lowering mechanism based on the outside air temperature around the vehicle so that the heat retainer and the battery adjoin each other.

3. The battery-equipped vehicle according to claim 2, further comprising a grille shutter provided at a front grille of the vehicle and configured to allow or block a flow of traveling air,
wherein the control device is configured to cause the grille shutter and the under panel to cooperate depending on a traveling condition of the vehicle to perform one or both of cooling of the battery and heat retention of the battery.

4. The battery-equipped vehicle according to claim 3,
wherein the under panel is divided into parts in a width direction of the vehicle or a length direction of the vehicle, and wherein the panel lifting and lowering mechanism is configured to lift or lower each of the parts independently.

5. The battery-equipped vehicle according to claim 4, wherein the control device is configured to incline the under panel to cross a horizontal direction via the panel lifting and lowering mechanism.

6. The battery-equipped vehicle according to claim 4, further comprising one or more protrusions on one or both of a bottom surface of the battery that faces the under panel and an upper surface of the under panel that faces the battery, the one or more protrusions being disposed such that the traveling air is to be blown on the one or more protrusions.

7. The battery-equipped vehicle according to claim 3, wherein the control device is configured to incline the under panel to cross a horizontal direction via the panel lifting and lowering mechanism.

8. The battery-equipped vehicle according to claim 3, further comprising one or more protrusions on one or both of a bottom surface of the battery that faces the under panel and an upper surface of the under panel that faces the battery, the one or more protrusions being disposed such that the traveling air is to be blown on the one or more protrusions.

9. The battery-equipped vehicle according to claim 2, wherein the control device is configured to incline the under panel to cross a horizontal direction via the panel lifting and lowering mechanism.

10. The battery-equipped vehicle according to claim 2, further comprising one or more protrusions on one or both of a bottom surface of the battery that faces the under panel and an upper surface of the under panel that faces the battery, the one or more protrusions being disposed such that traveling air is to be blown on the one or more protrusions.

11. The battery-equipped vehicle according to claim 1, wherein the control device is configured to incline the under panel to cross a horizontal direction via the panel lifting and lowering mechanism.

12. The battery-equipped vehicle according to claim 1, further comprising one or more protrusions on one or both of a bottom surface of the battery that faces the under panel and an upper surface of the under panel that faces the battery, the one or more protrusions being disposed such that traveling air is to be blown on the one or more protrusions.

13. A battery-equipped vehicle comprising:
an under panel provided near a bottom surface of the vehicle;
a battery disposed under a floor of the vehicle and above the under panel;
a panel lifting and lowering mechanism including an actuator and configured to lift or lower the under panel in a vertical direction; and
circuitry configured to control at least an operation of the panel lifting and lowering mechanism.

* * * * *